United States Patent
Mansuy et al.

(10) Patent No.: US 11,225,853 B2
(45) Date of Patent: Jan. 18, 2022

(54) METHOD OF WATER WELL REHABILITATION

(71) Applicant: Subsurface Technologies, Inc., Rock Tavern, NY (US)

(72) Inventors: Neil Mansuy, Kansas City, MO (US); Steven Catania, Gardiner, NY (US); Joseph Orlando, Sparkill, NY (US)

(73) Assignee: Subsurface Technologies, Inc., Rock Tavern, NY (US)

( * ) Notice: Subject to any disclaimer, the term of this patent is extended or adjusted under 35 U.S.C. 154(b) by 0 days.

(21) Appl. No.: 16/971,303

(22) PCT Filed: Feb. 20, 2019

(86) PCT No.: PCT/US2019/018781
§ 371 (c)(1),
(2) Date: Aug. 19, 2020

(87) PCT Pub. No.: WO2019/164956
PCT Pub. Date: Aug. 29, 2019

(65) Prior Publication Data
US 2021/0079760 A1    Mar. 18, 2021

Related U.S. Application Data

(60) Provisional application No. 62/632,856, filed on Feb. 20, 2018.

(51) Int. Cl.
*E21B 37/08*    (2006.01)
*E21B 43/16*    (2006.01)
*E21B 43/25*    (2006.01)

(52) U.S. Cl.
CPC ............ *E21B 37/08* (2013.01); *E21B 43/164* (2013.01); *E21B 43/255* (2013.01)

(58) Field of Classification Search
CPC ........ E21B 43/26; E21B 37/00; E21B 43/164; E21B 43/25; E21B 28/00; E21B 43/003
See application file for complete search history.

(56) References Cited

U.S. PATENT DOCUMENTS 6,250,388 B1    6/2001    Carmi et al.
7,270,179 B2    9/2007    Catania
(Continued)

FOREIGN PATENT DOCUMENTS

CA    2414071 C  *  6/2010    ............. E21B 37/00

OTHER PUBLICATIONS

International Search Report in International Application No. PCT/US19/018781, dated Jun. 24, 2019.
(Continued)

*Primary Examiner* — Zakiya W Bates
(74) *Attorney, Agent, or Firm* — Abraham Hershkovitz; Eugene C. Rzucidlo; Hershkovitz & Associates, PLLC

(57) ABSTRACT

A method of well rehabilitation using $CO_2$ comprises a more effective distribution of effective $CO_2$ energy throughout an entire well structure including all parts of a producing interval of a well and surrounding formation. The $CO_2$ phase changes are controlled during $CO_2$ injection to cause surging agitation within a well bore and surrounding formation and allow $CO_2$ energy to reach all areas of the well, and the $CO_2$ energy utilized includes at least one of chemical energy, thermal energy and mechanical energy.

17 Claims, 2 Drawing Sheets

Improved Energy Distribution Diagram

(56) References Cited

U.S. PATENT DOCUMENTS

| | | |
|---|---|---|
| 8,869,889 B2 | 10/2014 | Palmer et al. |
| 2002/0056550 A1 | 5/2002 | Catania et al. |
| 2005/0217851 A1 | 10/2005 | Mansuy |
| 2010/0044102 A1 | 2/2010 | Rinzler et al. |
| 2016/0010442 A1 | 1/2016 | Kearl |

OTHER PUBLICATIONS

Written Opinion of the International Searching Authority in International Application No. PCT/US19/018781, dated Jun. 24, 2019.

* cited by examiner

METHOD OF WATER WELL REHABILITATION

FIELD OF THE INVENTION

The present invention relates to an improvement in a method of water well rehabilitation

BACKGROUND OF THE INVENTION

Aqua Freed® is an innovative well cleaning process that utilizes natural carbon dioxide allowing easier compliance with regulatory discharge as well as better distribution of cleaning energy throughout the well, filter pack and the surrounding aquifer. Deposited material that causes a variety of operational problems, consists of a variety of mineral, biological and fines from the surrounding formation. The deposited material is soft at the early stages but during extended operation, complete mineralization takes place resulting in hardened deposits. This deposited material can grow to be difficult to remove requiring application of aggressive effective energy into the well and surrounding filter pack and near aquifer. (See U.S. Pat. No. 7,270,179)

Cleaning a well requires effective energy. Most of the energy utilized in the Aqua Freed® process is provided by the various phases of carbon dioxide ($CO_2$) as they go through phase changes. The phase in which $CO_2$ occurs is a function of temperature and pressure, and in well environments all three major phases of $CO_2$ (solid, liquid, and vapor) can occur. Aqua Freed® involves the controlled injection of liquid and vapor phases of carbon dioxide. As liquid $CO_2$ is injected into the well, the pressure and temperature encountered at the injection point do not initially provide a stable environment for liquid $CO_2$ to exist. The $CO_2$ therefore undergoes a phase change to vapor and solid. The phase change of $CO_2$ from a liquid to a vapor can cause a volume expansion of up to 570 times under atmospheric conditions. This volume expansion is one of the sources of energy that provide the cleaning action and agitation inside the well and the near well environment.

Another source of energy is the thermodynamic cooling of the water in the well due to the controlled injection of liquid $CO_2$ (liquid and solid $CO_2$ can be very cold). When the water gets cool enough, it can freeze. Solid water (ice) has a larger volume than liquid water and the formation of ice can break up and loosen materials that are clogging pore volume in a well.

There are many different aspects to the energy delivered into a well with the Aqua Freed® process that can be utilized.

Deliver energy into the well in the form of $CO_2$ liquid and vapor resulting in phase changes of Liquid to vapor, liquid to solid, and solid to vapor (sublimation). This has been demonstrated to be the most effective way to deliver energy that loosens clogging materials. The Aqua Freed® process is economical and restores the pumping capacity of a well and eliminates the need to neutralize and dispose of chemicals that can be dangerous.

SUMMARY OF THE INVENTION

It is an object of the present invention to improve to the Aqua Freed process by providing a better distribution of effective energy into all parts of a producing interval of the well that may have a long producing interval. It is also an object of this invention to overcome a challenge for distributing energy over the entire well structure.

A further objective of the present invention is to direct effective energy through the well screen and surrounding aquifer or directing energy into the fractures of an open hole rock well. Directing the energy more effectively can result in carbon dioxide volume reduction resulting in less residual carbonation and carbon dioxide that needs to be pumped during the development step of a well. Less carbon dioxide will speed up the time to get water quality back to ambient or pre-treatment conditions. In addition to directing the energy more effectively carbon dioxide volume refinement and adjustment based upon variation in porosity of different types of aquifers (geological units).

The distribution of energy can be achieved with combination energies including environmentally friendly chemicals that can be carried and distributed with the use of carbon dioxide energy in a sealed well. Carbon dioxide phase changes creates agitation of the chemistries allowing them to reach all areas of the well. Combination energies are necessary when wells have long producing intervals. Improvements to the existing Aqua Freed® approach involves using combination energies achieving more equal distribution of cleaning energies. The combination energies include chemical energy, thermal energy, and mechanical energy produced by the phase change of liquid to vapor, liquid to solid and solid to vapor of carbon dioxide. Chemical energy is provided by NSF approved proprietary chemicals that are effective on mineral solubility, effective on biological dispersion and disinfection, metal dispersion and clay dispersion. By placing chemistry in the well and utilizing the agitation of the carbon dioxide phase change the chemical energy is delivered more effectively to all portions of the well.

DETAILED DESCRIPTION OF THE INVENTION

Figure 1:
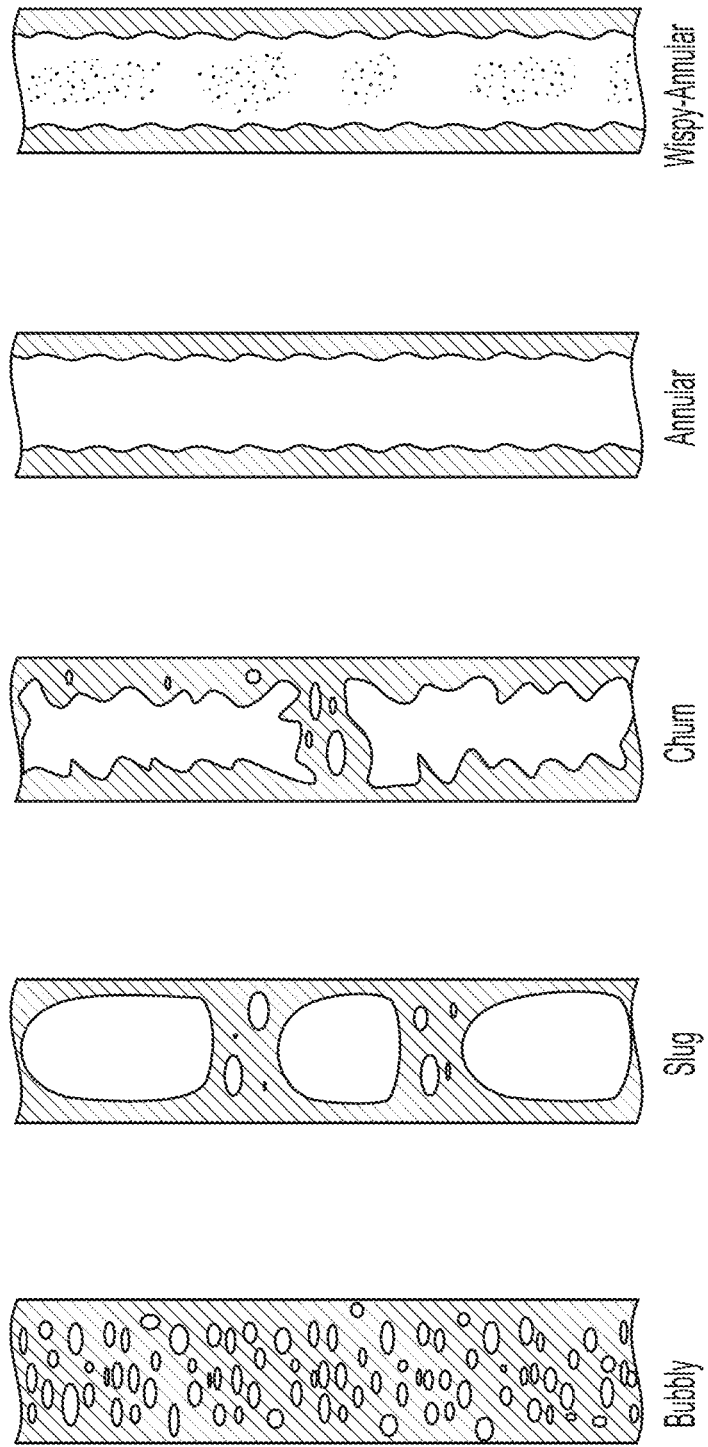
FIG. 1 is a figure representing the different flow regimes.

The present invention comprises an improved method of well rehabilitation comprising providing a more effective distribution of effective energy throughout an entire well structure including all parts of the producing interval of the well and surrounding formation and distributing energy throughout the entire well structure by controlling $CO_2$ phase changes during $CO_2$ injection to cause surging agitation within the well bore and surrounding formation and allowing $CO_2$, mechanical energy and optionally chemical energy to reach substantially all area of the well.

The present method can utilize at least one energy said energy including chemical energy, thermal energy and mechanical energy.

A feature of the present comprises utilizing phase changes of $CO_2$ to distribute environmentally safe chemicals throughout the entire well structure.

The present method further comprising setting a volume displacement pipe into the well prior to carbon dioxide injection wherein the volume displacement pipe has smaller diameter than the well screen or borehole wall to allow less energy required to displace water in the well and directing the cleaning combination energies more effectively to the screen or fractures of a rock well.

The volume displacement pipe (VDP) in the well during the injection process results in less carbon dioxide making the process more cost effective and shortening the following development time prior to returning water quality back to pretreatment quality.

The present method comprises injecting carbon dioxide in a fashion to create a vortex in the annular space between the volume displacement pipe and the well screen or borehole and casing allowing the combination energies to be delivered to all area of the well.

The present method comprises selecting a volume of carbon dioxide energy resulting in less penetration of solubilized carbon dioxide into surrounding formations resulting in less pump development time prior to returning the well back to ambient or pre-treatment conditions.

In the present method, in addition to the porosity of the aquifer, selecting the volume by evaluating the buffering capacity of the aquifer wherein the buffering capacity can be determined by assessment of the amount of carbonates in the aquifer and the total alkalinity of the water.

The present method comprises directing the injection nozzle for carbon dioxide at a desired angle to achieve a vortex in the annular space between the Volume Displacement Pipe (VDP) and the well screen or borehole wall wherein the vortex distributes energy or combination energies more efficiently throughout the well and surrounding aquifer.

The present method comprises injection of carbon dioxide into a sealed well to surge the well by switching between liquid injection and vapor injection cycles wherein the length of cycles is calculated based upon the length of the producing interval, the volume of water in the well treatment zone and the flow rate of carbon dioxide.

The method also comprises shortening a vapor injection cycle using more frequent cycles of liquid interval creating surging of the water column thus increasing the frequency of intervals between liquid and vapor maximizing the surging effect.

In the present method, the volume of carbon dioxide is refined using the total porosity and the volume in the treatment zone inside the well allowing maximum cleaning effect with less impact into the surrounding formation keeping the cleaning energy confined to the producing interval and a short distance horizontally from the well.

In the present method, the chemical energy is NSF approved proprietary chemical energy that can be effective at mineral solubility, biofilm and metal dispersion which requires the use of carbon dioxide injected into a sealed well to distribute the combination energies into the surrounding filter pack and aquifer.

The present further comprises an improved system for well rehabilitation wherein the improvement comprises a volume displacement pipe adapted to be inserted into the well prior to carbon dioxide injection wherein the volume displacement pipe has smaller diameter than the well screen or borehole wall, the volume displacement pipe is adapted to allow less energy required to displace water in the well and directing the cleaning combination energies more effectively to the screen or fractures of a rock well and an energy injection port wherein the energy injection port has at the distal end of the energy injection port an energy diversion port.

In the improved system, the energy diversion port can be an energy quick release valve.

In the present improved system, the energy diversion port is in the form of an elbow (el) at the distal end of the energy diversion port.

In the present improved system, the energy injection port is adapted to create a vortex in the annular space between the volume displacement pipe and a well screen or borehole and casing of the well allowing combination energies to be delivered to all area of the well.

The method and system of the present invention is not limited to water wells but can be utilized in any type of well which can be rehabilitated using the present improved method and system including, for example, desalination wells.

FIG. 1 represents the advantage of variable interval injection cycle when the well is being injected with liquid CO2, the water becomes supersaturated with carbon dioxide. When a transition is made at the injecting valve, from liquid to vapor CO2, the water that was filled with CO2 releases the CO2 and the water level quickly drops. Switching from liquid back to vapor results in a very sudden surge as water flows rapidly back into the well. This sudden surge back into the well can further disrupt attached material and mobilize detached clogging material as well as bring fines from the surrounding aquifer that have invaded the pore spaces surrounding the well.

Manipulating the injection interval of vapor and liquid will improve the efficiency and the effectiveness of the cleaning process. Maximizing the surge created by the change between liquid and vapor by lengthening the liquid time interval and shortening the vapor injection intervals. The surging effect is caused in the well by the change in concentration of the bubbles in the well. When liquid $CO_2$ is injected in the well, the concentration of bubbles in the well is very high and the surface of the water in the well is very agitated. The high concentration of bubbles in the well results in the movement of a high concentration of vapor upwards in the well creating a buoyancy effect. When a transition is made in the controlled injection of $CO_2$ from the liquid phase to the vapor phase, the high concentration of bubbles becomes much lower and the water level in the well falls quickly. Essentially, the volume in the water column that was filled with the high concentration of vapor collapses as the high concentration of $CO_2$ (liquid injection) ceases. In addition to the buoyancy effect during the liquid $CO_2$ injection the water level in the well is forced downward with gases coming out of solution and switching back to vapor results in water rushing back into the well creating a surging effect. Maximizing the surging caused by the transition from liquid to vapor can be done by calculating the volume of liquid required to create the 'buoyancy' effect. When the desired buoyancy effect is reached, a switch to the vapor injection can be made. With an understanding of the delivery pressure and flow of the $CO_2$ into the well, a timing mechanism can be used to deliver the liquid and vapor phases of $CO_2$. The control of the delivery with a timing mechanism will maximize this surging effect, ensuring that the delivery of the different phases creates the highest amount of water movement in the well.

In addition to maximizing the surging effect that the transition from liquid $CO_2$ to vapor $CO_2$ has on the water column, a greater control of the delivery of $CO_2$ to the well can maximize another form of energy delivery in the well during injection. Multiphase flow demonstrates that there are two forms of multiphase flow that the Aqua Freed® process entails. The first form of multiphase flow is the direct delivery of $CO_2$ into the well. The $CO_2$ will travel in the delivery equipment in three different forms, vapor only, liquid only, or vapor and liquid blend, depending on how the operator controls the injection. There are a multitude of flow regimes in which a two-phase fluid will flow in a vertical water column, bubbly, slug, churn, annular, and wispy-annular. The flow regime that the fluid will flow in is based on the concentration of vapor versus liquid, as well as the velocity of the liquid in the pipe. A determination of the best way to deliver the $CO_2$ mixture will be made and flow through the delivery pipe can be controlled with a flow control device to deliver the $CO_2$ in the method determined. The determination for the best way to deliver the $CO_2$ will be made based on which fluid flow regime provides the most effective way of creating 1) the surging effect caused by the transition of liquid to vapor in the injection process and 2) the vortex effect. The flow regime of $CO_2$ delivery would be targeted by the effect the chosen regime has on the Aqua Freed® process. The second aspect is the multi-phase flow beyond the injection point. As the liquid and vapor phases enter the well, and the liquid phase changes to vapor, a new multiphase regime is encountered where the liquid phase is the water in the well and the vapor phase is the rising $CO_2$ vapor. The goal of this second flow regime is to remove the most amount of clogging material. An inspection of FIG. 1 shows that certain flow regimes look more disruptive than other flow regimes. Particularly, the bubbly and annular regimes do not seem to be as disruptive as the slug or churn regimes. The injection would be controlled according to the multiphase regime which would disrupt the near well environment the most.

Refinement of volume of carbon dioxide required to achieve the desired cleaning effect. Evaluating flow test data from a well to be cleaned can give an estimate of the "Total Porosity". Total porosity is the fraction of total geological unit that is open pore space. The effective porosity is the pore spaces that will effectively produce water and take carbon dioxide. This can be a single unit quantification of the amount of space available for fluid and thus available for carbon dioxide to penetrate. The total porosity will then be used to refine the volume of carbon dioxide to be utilized. The refinement of the volume with allow maximum cleaning effect with less impact into the surrounding formation keeping the cleaning energy confined to the producing interval and a short distance horizontally from the well. This fraction of the total volume will thus range between 0 and 1. Some of the common soils that wells are completed in have common ranges such as:

| Aquifer Material | Porosity % |
|---|---|
| Silt | 35 to 50 |
| Medium to coarse sand | 25 to 40 |
| Uniform sand | 30 to 40 |
| Fine to medium mixed sand | 30 to 35 |
| Gravel | 25 to 40 |
| Gravel and sand | 20 to 35 |
| Crystalline rock, fractured | 0 to 10 |
| Basalt, fractured | 5 to 50 |
| Karstic limestone | 5 to 50 |
| Limestone | 0 to 20 |
| Sandstone | 5 to 30 |

The discharge rate from a well will be utilized to adjust the volume of carbon dioxide to be injected into the well. The volume currently utilized based upon significant experience and know-how can be adjusted based upon the discharge rate from the well. The following adjustments from the existing volume calculations can be utilized as follows:

| | |
|---|---|
| More than 1500 gallons per minute | Use existing volume calculation |
| 1000 to 1500 gallons per minute | 90% of existing volume calculation |
| 500 to 1000 gallons per minute | 80 percent of existing calculation |
| 250 to 500 gallons per minute | 75 percent of existing calculation |
| 100 to 250 gallons per minute | 60 percent of existing calculation |
| Less than 100 gallons per minute | 50 percent of existing calculation |

Figure 2:
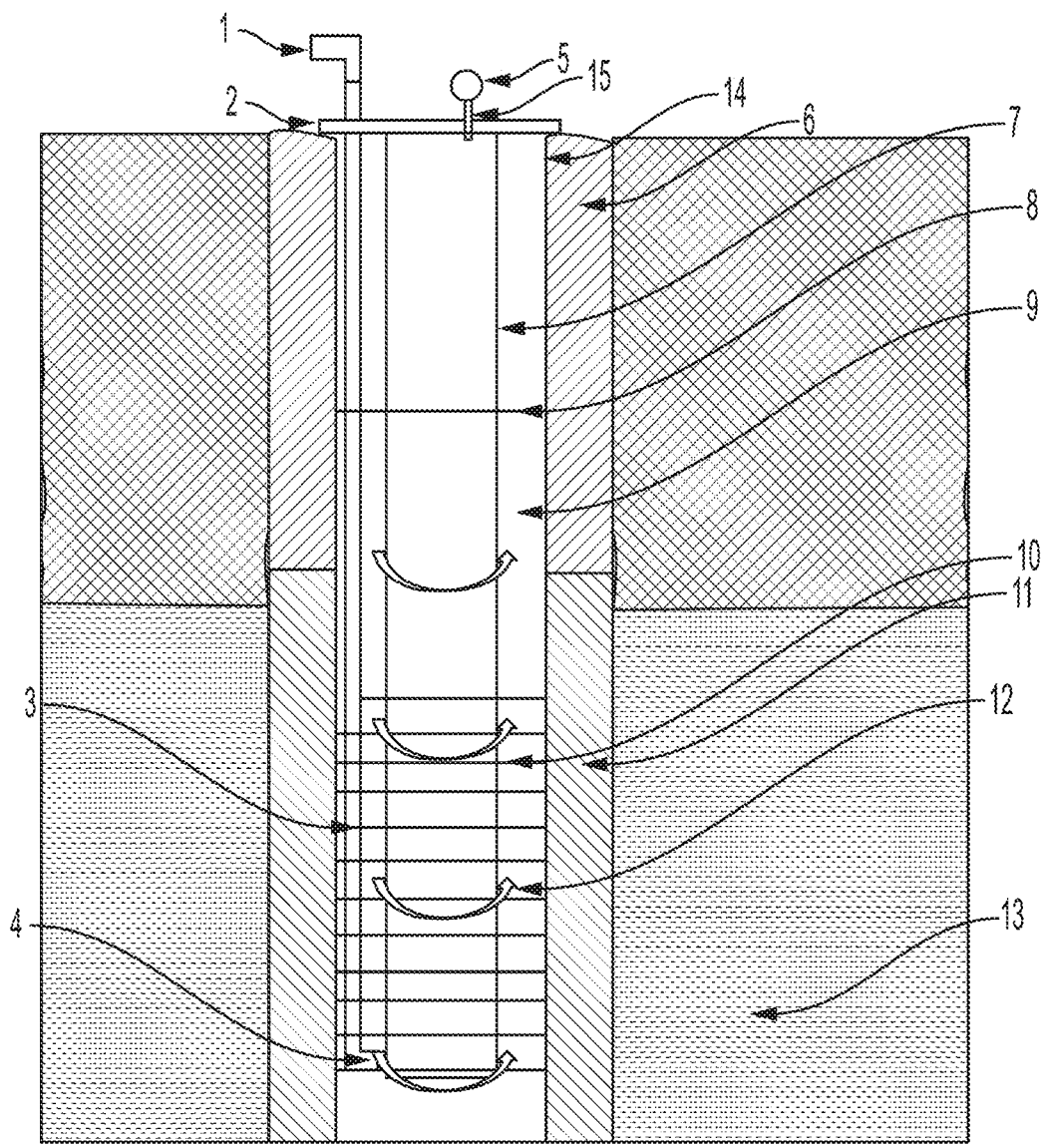
FIG. 2 shows a screened well with filter pack configured for energy injection.

FIG. 2 shows a screened well with filter pack with volume displacement pipe in the well 7, but many different types of wells exist and require similar energy for cleaning.

The different types of water wells can include water supply wells, injection wells, ASR wells, recovery wells, monitor wells, collector wells, slant wells, horizontal wells, directional wells, etc. Any other type of well including open hole rock wells would be cleaned with the similar steps.

Water well are sealed with flange 2 or a packer placed inside well casing 14. Carbon dioxide or selected chemicals are introduced into the water well through injection line 1,3. The chemicals if used must be approved to be placed into a water well. Carbon dioxide in various intervals are introduced into the well through injection line 1,3. And regulated based upon injecting energy into a sealed well 2 at safe pressures and monitored by pressure gauge 5 through a port 15. The non-pumping water level or static water level is represented by 8 in the diagram. Injecting carbon dioxide into a sealed well 2 does require a well to have some grout 6 around the well casing 14. The intervals of carbon dioxide in both gaseous and liquid phase are introduced based upon the art of cleaning process to achieve maximum energy distribution. With very long screens or open hole intervals chemical energy and carbon dioxide energy can be distributed over the entire well producing interval 10 and penetrate the combination energies into the filter pack 11 and the surrounding formation 13. The energy release from phase changes of carbon dioxide is necessary to distribute energy over the entire well structure 10, 11 and into the surrounding formation 13 in the zone of the of a water well that is plugged with mineral, biological and fine material from the aquifer. A reduced amount of carbon dioxide and/or chemical energy is utilized with the volume displacement pipe 7. The volume displacement pipe 7 also directs the carbon dioxide or combination energies where plugging deposits occur 10, 11, 13.

Carbon dioxide injected into a sealed well 2 through injection pipe 1,3 through diversion elbow 4 creates a vortex 12 in the reduced annular space 9. The vortex 12 allows the combination energies to be distributed from the injection point represented by diversion elbow 4 and upward inside the well allowing the entire well and near well to be cleaned more effectively. The volume displacement pipe 7 can reduce the amount of energy needed to clean the entire well 10, 11, 13 with less energy penetrating into the surrounding formation 13. With less energy penetrating into the surrounding formation 13 less time is required to return the water well to ambient or pretreatment conditions. Usually the following day the injection equipment 1,2,3 and the volume displacement pipe 7 is removed and traditional development methods are employed to remove detached and solubilized plugging deposits from the well 10, 11, 13.

IMPROVED ENERGY DISTRIBUTION
DIAGRAM ELEMENTS LIST (FIG. 2)

1: Energy Injection port
2: Well sealed with flange—Can also utilize a packer

3: Carbon dioxide and/or chemical injection line into lower part of the well
4: Energy diversion port or energy quick release valve
5: Pressure gauge to measure internal well pressure
6: Grout seal
7: Volume displacement pipe
8: Static water level
9: Reduced annular space between well casing and screen or open hole and volume displacement pipe
10: Well screen or borehole face of rock well
11: Filter pack or natural pack
12: Vortex created by carbon dioxide injection and directional valve
13: Consolidated or unconsolidated aquifer
14: Well casing
15: Port through sealed well

What we claim is:

1. In a method of well rehabilitation using $CO_2$, the improvement comprising providing a more effective distribution of effective $CO_2$ energy throughout an entire well structure including all parts of a producing interval of a well and surrounding formation, and distributing $CO_2$ energy throughout the entire well structure by controlling $CO_2$ phase changes during $CO_2$ injection to cause surging agitation within a well bore and surrounding formation and allowing $CO_2$ energy to reach all areas of the well, wherein the $CO_2$ energy utilized is at least one of chemical energy, thermal energy and mechanical energy.

2. The method of claim 1, wherein the $CO_2$ energy utilized is a combination of two or more of chemical energy, thermal energy and mechanical energy.

3. The method of claim 2 comprising utilizing phase changes of $CO_2$ to distribute environmentally safe chemicals throughout the entire well structure.

4. The method of claim 2, wherein the chemical energy is an industry approved chemical energy that can be effective at mineral solubility, biofilm and metal dispersion which requires the use of $CO_2$ injected into a sealed well to distribute combination energies into a surrounding filter pack and aquifer.

5. The method of claim 1, further comprising setting a volume displacement pipe into the well prior to $CO_2$ injection wherein the volume displacement pipe has a smaller diameter than a well screen or borehole wall to reduce energy required to displace water in the well and to direct a combination of cleaning energies more effectively to a screen or fractures of a rock well.

6. The method of claim 1, comprising utilizing a volume displacement pipe (VDP) in the well during an injection process to reduce an amount of $CO_2$ required to make the process more cost effective and shorten a following development time prior to returning water quality back to pre-treatment quality.

7. The method of claim 1, comprising injecting C2 in a fashion to create a vortex in an annular space between a volume displacement pipe and a well screen or borehole and casing, allowing the combination energies to be delivered to all areas of the well.

8. The method of claim 1, comprising selecting a volume of $CO_2$ energy resulting in less penetration of solubilized $CO_2$ into surrounding formations resulting in less pump development time prior to returning the well back to ambient or pre-treatment conditions.

9. The method of claim 1, comprising in addition to a porosity of an aquifer, selecting a volume of $CO_2$ by evaluating a buffering capacity of the aquifer, wherein the buffering capacity can be determined by assessment of an amount of carbonates in the aquifer and a total alkalinity of the water.

10. The method of claim 1, comprising directing an injection nozzle for $CO_2$ at a desired angle to achieve a vortex in an annular space between a Volume Displacement Pipe (VDP) and a well screen or borehole wall, wherein the vortex distributes energy or combination energies more efficiently throughout the well and surrounding aquifer.

11. The method of claim 1, comprising injection of $CO_2$ into a sealed well to surge the well by switching between liquid injection and vapor injection cycles, wherein a length of each cycle is calculated based upon a length of the producing interval, a volume of water in a well treatment zone and a flow rate of $CO_2$.

12. The method of claim 1, comprising shortening a vapor injection cycle using more frequent cycles of a liquid interval creating surging of a water column, thus increasing a frequency of intervals between liquid and vapor and maximizing a surging effect.

13. The method in claim 1, whereas a volume of $CO_2$ is refined using a total porosity and a volume in a treatment zone inside the well, allowing maximum cleaning effect with less impact into the surrounding formation and keeping the cleaning energy confined to the producing interval and a short distance horizontally from the well.

14. An improved system for well rehabilitation, the improvement comprising a volume displacement pipe adapted to be inserted into a well prior to $CO_2$ injection, wherein the volume displacement pipe has a smaller diameter than a well screen or borehole wall, and the volume displacement pipe is adapted to require less energy to displace water in the well and to direct a combination of cleaning energies more effectively to the screen or fractures of a rock well, and an energy injection port wherein the energy injection port has at a distal end an energy diversion port.

15. The improved system of cairn 14, wherein the energy diversion port can be an energy quick release valve.

16. The improved system of claim 14, wherein the energy diversion port is in the form of an elbow (el) at the distal end of the energy injection port.

17. The improved system of claim 14, wherein the energy injection port is adapted to create a vortex in an annular space between the volume displacement pipe and a well screen or borehole and casing of the well, allowing combination energies to be delivered to all areas of the well.

* * * * *